(12) United States Patent
Presti

(10) Patent No.: US 6,406,282 B1
(45) Date of Patent: Jun. 18, 2002

(54) SEALING RING AND RIM ASSEMBLY FOR USE IN RETREADING TIRES

(75) Inventor: Darryl C. Presti, Chalfont, PA (US)

(73) Assignee: Presti Rubber Products, Inc., New Britain, PA (US)

( * ) Notice: Subject to any disclaimer, the term of this patent is extended or adjusted under 35 U.S.C. 154(b) by 0 days.

(21) Appl. No.: 09/518,851

(22) Filed: Mar. 3, 2000

Related U.S. Application Data

(60) Provisional application No. 60/122,684, filed on Mar. 3, 1999.

(51) Int. Cl.[7] .................................. B29D 30/54
(52) U.S. Cl. ........................ 425/14; 156/96; 425/17; 425/36
(58) Field of Search .................. 425/14, 17, 20, 425/36; 156/96

(56) References Cited

U.S. PATENT DOCUMENTS

| | | | | |
|---|---|---|---|---|
| 3,886,028 A | * | 5/1975 | Hindin et al. ............... | 156/96 |
| 3,923,586 A | * | 12/1975 | Gross ........................... | 156/96 |
| 4,111,732 A | * | 9/1978 | MacMillan ................... | 156/96 |
| 4,634,357 A | * | 1/1987 | Brewer et al. ................ | 425/36 |
| 5,098,268 A | | 3/1992 | Robinson ...................... | 425/14 |
| 5,518,384 A | | 5/1996 | Presti et al. .................. | 425/36 |
| 5,698,064 A | * | 12/1997 | Fujimoto ...................... | 425/17 |
| 6,056,852 A | * | 5/2000 | Presti et al. .................. | 425/17 |

* cited by examiner

*Primary Examiner*—James P. Mackey
(74) *Attorney, Agent, or Firm*—Howson and Howson

(57) ABSTRACT

A sealing ring and rim assembly for use with an outer curing envelope to retread a tire casing. The assembly includes a rigid annular rim having a fixed diameter and a resiliently expandable elastomeric annular sealing rim captured on the rim. An inflatable bladder is located between the rim and the sealing ring so that, when the bladder is inflated, the sealing ring expands into uniform sealing engagement with an inner peripheral bead of the tire casing. The use of an inflatable bladder ensures that sealing pressure will be uniformly exerted so that an endless band of seal is created about the entire circumference of the tire bead. In addition, one particular size of the assembly is capable of use on a variety of tires having a tire bead circumference within a range of circumferences.

11 Claims, 2 Drawing Sheets

SEALING RING AND RIM ASSEMBLY FOR USE IN RETREADING TIRES

CROSS REFERENCE TO RELATED APPLICATION

The present application claims the priority benefit of U.S. provisional application Ser. No. 60/122,684 filed on Mar. 3, 1999

FIELD OF THE INVENTION

The present invention relates generally to tire retreading, and more particularly, the present invention relates to securing an annular elastomeric sealing ring to an inner peripheral tire bead such that an endless, ring-shaped air tight seal is created along the entire tire bead circumference.

BACKGROUND OF THE INVENTION

Examples of processes which utilize a single outer curing envelope and a pair of sealing rings for retreading a tire are discussed in the present assignee's U.S. Pat. No. 5,518,384 issued to Presti et al. and U.S. Pat. No. 5,098,268 issued to Robinson. Worn tread on a used tire casing is buffed off to a profile suitable for mounting a new tread. Then, a pre-cured and buffed tread is adhered about the periphery of the casing with a laminate of uncured cushion gum cemented between the tread and the casing. An outer annular elastomeric curing envelope having an inwardly-opening U-shaped radial cross section is positioned over the new tread and a portion of the outer sidewalk of the tire casing. A pair of annular elastomeric sealing rings are secured about the inner peripheral beads of the tire casing and cooperate with the outer curing envelope to encase the tire casing outer sidewalk. A vacuum is drawn through a valve in the outer curing envelope for stretching the envelope into intimate contact with all surfaces of the tread. The tire is then placed in an autoclave for several hours at an elevated temperature and pressure to cure the gum and positively bond the casing and tread. The outer curing envelope and sealing rings are removed and the retreaded tire is ready for use.

An important step in the above-described tire retreading process is the step of securing the sealing ring to the tire beads. The sealing rings must engage and form an airtight seal with the tire beads so that a vacuum is properly drawn. The vacuum ensures that air or steam does not penetrate into the cushion gum during curing of the gum because the presence of air bubbles, or pockets of air, between the curing envelope and the tire will prevent proper curing of the gum and will cause tread distortion. In addition, air pockets prevent pressure from being uniformly applied over the entire bonding area which also causes tread distortion.

U.S. Pat. No. 5,098,268 discloses a two step process of first mounting the sealing rings on the tire casing, and then separately mounting the rims within the inner periphery of the sealing rings to compress the sealing rings to the tire beads. See FIG. 2 and column 4, lines 26–31, of the '268 patent. In FIG. 4 and column 4, lines 40–45, of the '268 patent, an alternate embodiment is disclosed which utilizes a bonding agent to bond the sealing rings onto the rims to form a unitary structure capable of being quickly mounted. An advantage of the rim disclosed in the '268 patent is that it exerts substantially uniform pressure on the sealing ring and tire bead throughout the entire circumferences of the sealing ring and tire bead. Thus, the uniform pressure results in the formation of a proper air tight 360° ring, or band, of seal.

U.S. Pat. No. 5,518,384 discloses the use of an expandable and retractable rim to compress a sealing ring into airtight engagement with a tire bead. The rim includes a ratchet mechanism which enables the diameter of the rim to be incrementally increased or decreased. The advantage of the adjustable rim of the '384 patent is that it can be utilized on a variety of tires having various bead circumferences.

Although the above-referenced sealing ring and rim assemblies are satisfactory for their intended purposes, there is a need for an improved sealing ring and rim assembly which is easy to mount and dismount on various tire types and sizes. The sealing ring and rim assembly should be adjustable so that it can be used on various tire bead sizes within a range of sizes. The assembly should also be capable of exerting substantially uniform pressure along the entire circumference of the tire bead so that a proper air tight seal is created. In addition, the sealing ring and rim assembly should be easy to use and inexpensive to manufacture.

OBJECTS OF THE INVENTION

With the foregoing in mind, a primary object of the present invention is to provide a novel sealing ring and rim assembly for use with an outer curing envelope to retread tire casings of various sizes, configurations and bead circumferences.

Another object of the present invention is to provide an improved sealing ring and rim assembly which can be readily mounted onto a tire such that outward radial pressure is uniformly applied along the entire circumference of the tire bead to create an effective air tight seal between the tire bead and the sealing ring.

A further object of the present invention is to provide an adjustable sealing ring and rim assembly which is capable of re-use over an extended period.

A still further object of the present invention is to provide a sealing ring and rim assembly which is easy to use and inexpensive to manufacture.

SUMMARY OF THE INVENTION

More specifically, the present invention provides a sealing ring and rim assembly for use in retreading a tire casing having opposed sidewalls terminating in a pair of inner peripheral beads. The assembly includes a rigid annular rim having a fixed predetermined diameter and capable of being readily positioned within one of the inner peripheral beads of the tire casing. An annular elastomeric sealing ring is seated on the annular rim and is capable of being expanded relative to the rim into airtight engagement with the peripheral bead of the tire casing. The sealing ring is expandable by an annular inflatable bladder located on the rim and positioned between the rim and the sealing ring. When the bladder is inflated, the sealing ring is forced to expand radially outward relative to the rim, and when the bladder is deflated, the sealing ring is permitted to contract radially inward relative to the rim.

DESCRIPTION OF THE DRAWINGS

The foregoing and other objects, features and advantages of the present invention should become apparent from the following description when taken in conjunction with the accompanying drawings, in which.

DETAILED DESCRIPTION OF THE PREFERRED EMBODIMENT

Figure 1:
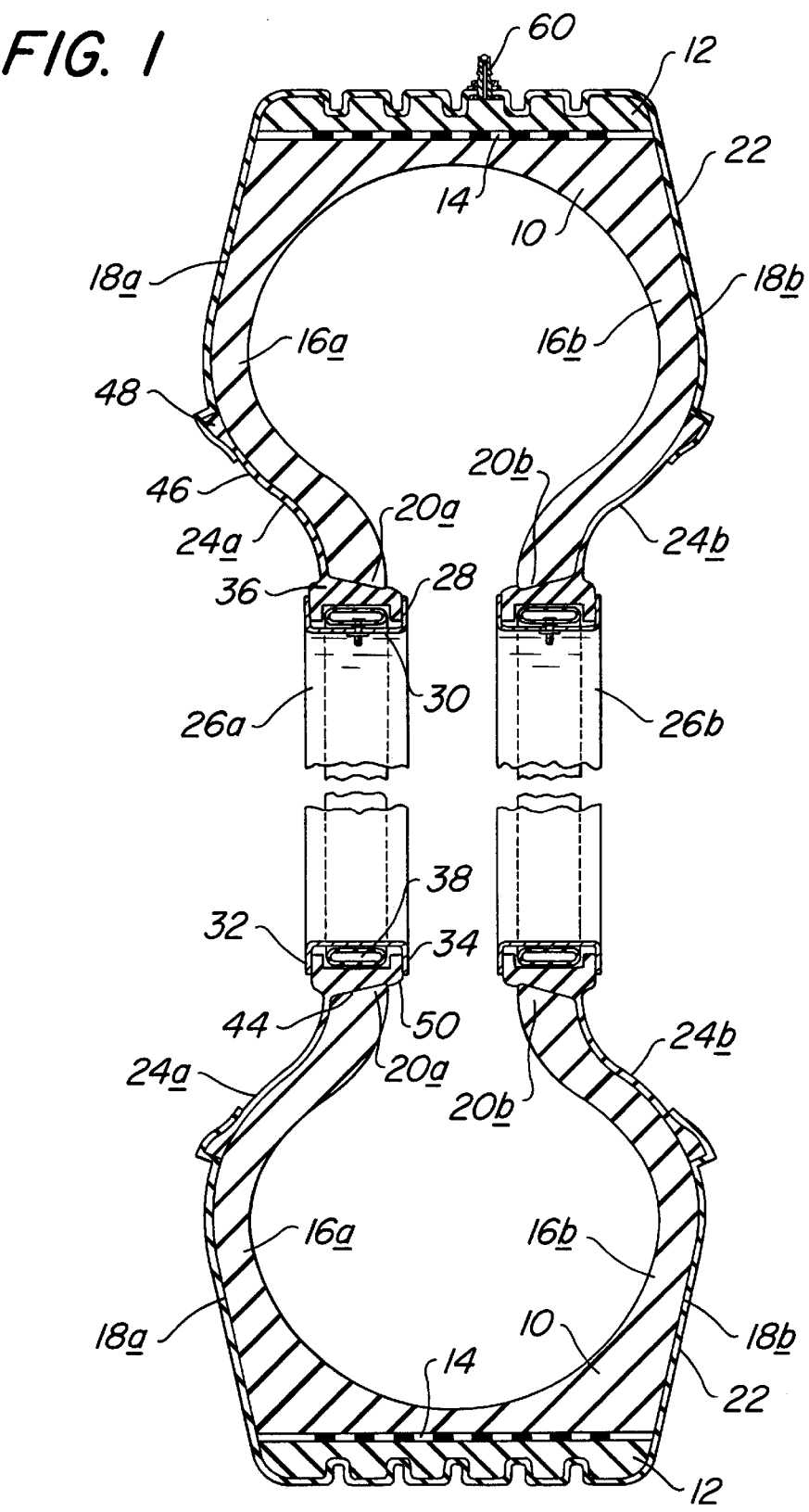
FIG. 1 is a fragmentary radial cross sectional view of a pair of sealing ring and rim assemblies mounted onto a tire casing being retreaded.
Figure 2:
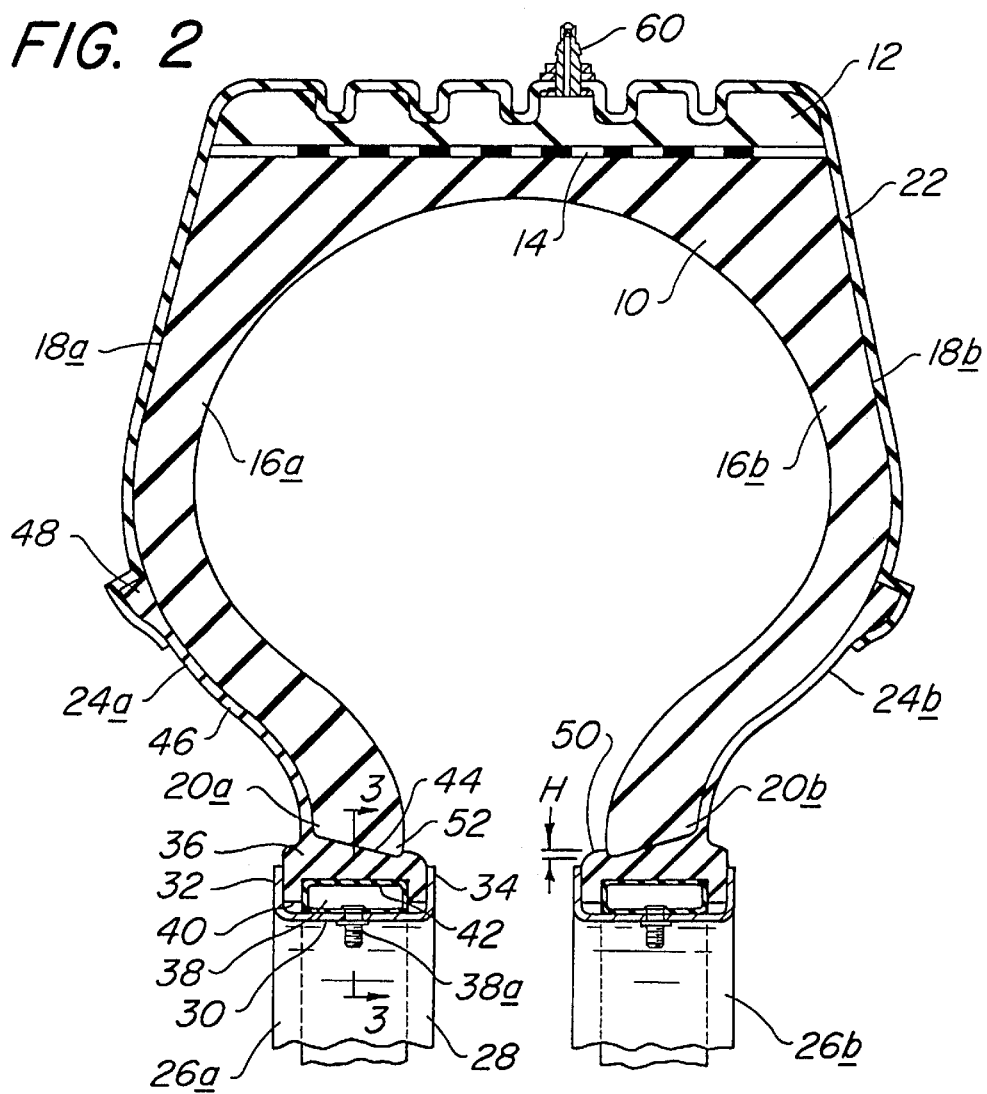
FIG. 2 is an enlarged radial view of a section of FIG. 1.
Figure 3:
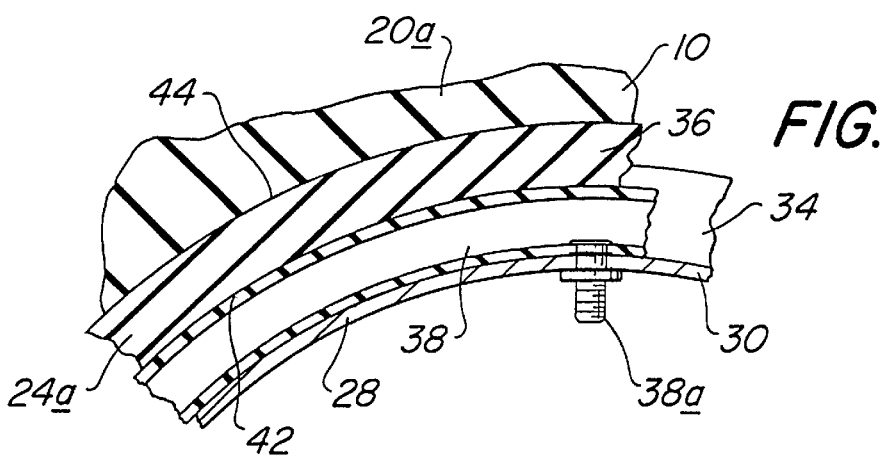
FIG. 3 is a fragmentary cross-sectional view of one of the sealing ring and rim assemblies and one of the tire beads illustrated in FIG. 2, the view taken along the line 3—3 of FIG. 2.

As discussed above, tires having worn treads can be retreaded for re-use. FIGS. 1 and 2 illustrate a casing 10 of a worn tire in which old worn tread (not shown) has been removed and replaced with a strip of new pre-cured tread 12. The tread 12 is adhered to the outer periphery of the casing 10 with a laminate of uncured cushion gum 14 cemented between the tread 12 and the casing 10. The tread 12 becomes permanently bonded to the casing 10 when the gum is cured during the curing process discussed below. As also illustrated in FIGS. 1 and 2, the tire casing includes a pair of opposed sidewalls, 16a and 16k, each having an outer surface, 18a and 18b, and each terminating in an inner peripheral bead, 20a and 20k.

As stated above, examples of processes for retreading tires are disclosed in the present assignee's U.S. Pat. No. 5,518,384 issued to Presti et al. and U.S. Pat. No. 5,098,268 issued to Robinson. The disclosure of both these patents are incorporated herein by reference.

According to the present invention, as illustrated in FIGS. 1 and 2, an annular outer elastomeric curing envelope 22 having an inwardly-opening U-shaped radial cross section is placed over and encases the new tread 12, gum 14, and portions of outer surfaces, 18a and 18b, of both tire casing sidewalls 16a and 16h. The outer curing envelope 22 cooperates with a pair of annular elastomeric sealing rings 24a and 24k to completely encase the outer surfaces 18a and 18h of each tire casing sidewalk 16a and 16b.

After the outer sidewalk surfaces, 18a and 18b, the new tread 12, and the uncured gum 14 are encased within the outer curing envelope 22 and sealing rings, 24a and 24k, a vacuum is drawn to stretch the envelope and sealing rings into intimate contact with the new tread and tire casing. To this end, a valve 60 which extends through the outside curing envelope 22 is connected to a pump (not shown) for drawing the vacuum. The encased tire is then placed within an autoclave to cure the gum 14.

It is important for proper curing that all air/gas between the curing envelope 22 and sealing rings, 24a and 24h, and the tire casing 10 and tread 12 be evacuated and that formation of air pockets be prevented. This requires the positive formation of an air tight, uninterrupted ring of seal between the sealing rings, 24a and 24b, and the tire beads, 20a and 20b. Any leakage paths which are permitted to exist between the sealing rings and tire beads will negatively affect the retreading and curing process.

The present invention utilizes a pair of re-useable, unitary sealing ring and rim assemblies, 26a and 26b, to form a pair of uniform, 360°, endless rings of seal with the tire beads 20a and 20b. The assemblies, 26a and 26b, are substantially identical in construction, and each is utilized to engage one of the pair of tire beads, 20a and 20b, of the tire casing 10. For example, assembly 26a is mounted to tire bead 20a and assembly 26b is mounted to tire bead 20k. The assembly 26a is discussed below in detail.

Assembly 26a includes a rigid annular rim 28 made, for instance, of metal, and formed with a predetermined, fixed outer diameter. The fixed diameter is such that the assembly is readily received within the inner peripheral tire bead of the tire casing being retreaded. As best illustrated in FIG. 2, the rim 28 is provided with a substantially outwardly-opening U-shaped radial cross section formed by an annular peripheral portion 30 and a pair of radially outward extending sidewalls 32 and 34. The purpose of the U-shape is to capture the sealing ring 24a seated thereon.

The sealing ring 24a has a base portion 36 seated about the outer diameter of the rim 28 and capable of engaging the tire bead 20a. The base portion 36 is captured on the rim 28 between the sidewalls, 32 and 34, and has a width such that it simultaneously contacts both sidewalls 32 and 34 in a manner which permits sliding of the base portion 36 in radially inward and outward directions relative to the sidewalls 32 and 34. Thus, the diameter of the sealing ring 24a is permitted to expand relative to the rim 28 so that the sealing ring 24a engages the tire bead 20a, or alternatively, to contract relative to the rim 28 so that the sealing ring 24a disengages from the tire bead 20a. In either case, the sealing ring 24a is continuously captured by on the rim 28.

An inflatable bladder 38 is utilized to force the diameter of the sealing ring 24a to expand radially outward. To this end, the bladder 38 is located about the outer diameter of the rim 28 between the rigid rim 28 and the resiliently expandable sealing ring 24a. Continued inflation of the bladder 38 forces the sealing ring 24a to uniformly expand radially outward until it engages and forms a uniform, endless band of seal with the tire bead 20a.

The advantage of the assembly of the present invention is that the annular inflatable bladder 38 exerts even and uniform radial force about the entire circumference of the sealing ring 24a which prevents the formation of leakage paths between the sealing ring and the tire bead. This is an improvement over the above cited prior art because mechanical ratchet mechanisms do not exert uniform force throughout their entire circumference, and because fixed diameter rims used without means to expand the sealing ring restricts use of the assembly to one particular circumference size of tire beads. Thus, a given assembly according to the present invention can be used on tire beads having a circumference within a range of circumferences and can repeatedly create a uniform band of seal.

Preferably, the base portion 36 of the sealing ring 24a has an inner annular surface 40 facing the annular peripheral portion 30 of the rim 28. The spacing between the sealing ring inner surface 40 and the rim peripheral portion 30 is determined by the degree of inflation of the bladder 38. Preferably, an annular inwardly-opening channel 42 is formed in the sealing ring inner surface 40 and receives at least a portion of the inflatable bladder 38 to properly position the bladder 38 on the rim 28. The bladder 38 has a valve stem 38a which extends through an aperture in the rim 28.

The base portion 36 of the sealing ring 24a also has a radially outward facing surface 44 specifically shaped to engage the tire bead 20a. When the bladder 38 is deflated, the diameter of sealing ring surface 44 is such that it permits ready location within, or out of, the circumference of the tire bead 20a. As the bladder 38 is inflated, the diameter of the sealing ring surface 44 expands radially outward in a uniform manner until it engages the tire bead 20a and forms an endless band of air tight seal therewith. The sealing ring 24a is made of a resilient material such that, when the bladder is deflated, the sealing ring surface 44 returns back to its original size to permit ready dismounting of the assembly 26a from the tire casing 10.

The sealing ring 24a has an outer annular flange 46 extending from the base portion 36 for engaging portions of the outer surface 18a of the tire casing sidewalk 16a. The flange 46 extends along the tire sidewall 16a to the outer curing envelope 22 where it underlies a portion of the outer curing envelope 22 and forms an airtight seal therewith. To this end, the outer terminating edge of the flange 46 is provided with an annular sealing rib 48 which is engaged by the outer curing envelope 22.

The sealing ring 24a also has an inner annular bead, or lip, 50 extending radially outward from the base portion 36 a spaced distance from the outer annular flange 46. When the sealing ring 24a is expanded into sealing relation with the tire bead 20a, the lip 50 engages an inner edge 52 of the tire bead 20a to positively lock the sealing ring 24a on the tire bead 20a. The lip 50 extends a relatively short height "H" above the sealing ring surface 44 so that the lip 50 can readily fit within the tire bead circumference when the assembly 26a is being mounted on, or dismounted from, the tire casing 10.

By way of example, and not by way of limitation, the fixed diameter rim 28 can be made from a single piece of rigid material, or alternatively, can be made of two annular half pieces welded together. Preferably, the annular inflatable bladder 38 has an oval-shaped radial cross section; however, other bladders cross sectional shapes can also be utilized. The fixed diameter of the rim, the amount of radially outward expansion capable by the sealing ring, and the size of the bladder can be designed as appropriately for use with a wide range of tire bead sizes.

Thus, the unitary sealing ring and rim assembly of the present invention provides a ready means of securing a sealing ring to a tire bead in a manner that results in the formation of a uniform band of seal. The assembly is adjustable so that various bead circumferences can be accommodated by one specifically sized assembly. The assembly is easy to mount on, and dismount from, tire casings, is re-useable, and is relatively easy and inexpensive to manufacture. While a preferred sealing ring and rim assembly has been described in detail, various modifications, alterations, and changes may be made without departing from the spirit and scope of the sealing ring and rim assembly according to the present invention as defined in the appended claims.

What is claimed is:

1. A sealing ring and rim assembly for use in retreading a tire casing having opposed sidewalls terminating in a pair of inner peripheral beads, comprising:
   a rigid annular rim having a fixed predetermined diameter capable of being located entirely within one of the inner peripheral beads of the tire casing;
   an annular molded elastomeric sealing ring seated on and captured by said annular rim and capable of being expanded radially outward relative to said rim into airtight engagement with the peripheral bead of the tire casing; and
   an annular bladder positioned between said rim and said sealing ring, said bladder capable of being inflated to force said sealing ring to expand radially outward relative to said rim and being deflated to permit said sealing ring to contract radially inward relative to said rim;
   said sealing ring having an annular base portion with a radially outward facing surface for engaging an endwall of one of the peripheral beads of the tire casing;
   said sealing ring having an integral outer annular flange extending from said base portion for confronting portions of the outer sidewall of the tire casing; and
   said sealing rung having an integral continuous inner annular bead extending from said base portion in spaced relation from said outer annular flange for engaging an inner edge of the peripheral bead of the tiring casing.

2. A sealing ring and rim assembly according to claim 1, wherein said rim has an annular peripheral portion and a pair of sidewalls extending radially outward therefrom providing said rim with an outwardly-opening U-shaped radial cross section; and wherein said annular base portion of said sealing ring is captured on said rim between said rim sidewalls.

3. A sealing ring and rim assembly according to claim 2, wherein said base portion of said sealing ring is in sliding engagement with said rim sidewalls to permit outward radial expansion and inward radial contraction of said sealing ring relative to said annular peripheral portion of said rim.

4. A sealing ring and rim assembly according to claim 3, wherein said base portion of said sealing ring has an annular, inwardly-opening channel facing said peripheral portion of said rim, and wherein at least a portion of said bladder is positioned within said channel.

5. A sealing ring and rim assembly according to claim according to claim 1, wherein said bladder has a diameter which is less than a diameter of the peripheral bead of the tiring casing so that, when said bladder and peripheral bead of the tire casing are concentrically disposed, said bladder fits entirely within the peripheral bead of the tire casing.

6. A sealing ring and rim assembly for use with an outer annular curing envelope to retread a tire casing, the tire casing having opposed sidewalls terminating in a pair of inner peripheral beads, the outer curing envelope having an inwardly opening U-shaped radial cross section for enclosing a tread strip mounted on the tire casing and having skirts extending alongside annular portions of the outer sidewalls of the tire casing, comprising:
   an annular molded elastomeric sealing ring having an annular base portion for engaging one of the peripheral beads of the tire casing, an outer annular flange extending from said base portion for confronting portions of the outer sidewalk of the tire casing, and an integral continuous inner annular bead extending from said base portion in spaced relation from said outer annular flange for engaging an Inner edge of the peripheral bead of the thing casing;
   a rigid annular rim having a fixed predetermined diameter and housing said annular base portion of said seating ring; and
   an annular bladder located on said rim and capable of being inflated and deflated, when inflated, said bladder causes radially outward expansion of said sealing ring into airtight engagement with an endwall of the peripheral bead of the tire casing, and when deflated, said bladder permits said sealing ring to contract radially inward so that said rim and sealing ring is readily positioned within, and removed from, the peripheral bead of the tire casing;
   said annular rim having walls forming an outwardly-opening U-shaped radial cross section; and
   said annular base portion being captured within said walls of said rim and being slidably engaged thereto to permit expansion and contraction of said sealing ring.

7. A sealing ring and rim assembly according to claim 6, wherein said base portion of said sealing ring has an annular, inwardly-opening channel facing said rim, and wherein said bladder is seated on said rim and within said channel.

8. A sealing ring and rim assembly according to claim 6, wherein said outer annular flange of said sealing ring has an annular sealing rib for underlying engagement with one of the skirts of the outer curing envelope.

9. A sealing ring and rim assembly according to claim 6, wherein said bladder has a valve stem used to inflate and deflate said bladder, and wherein said valve stem extends through an aperture formed in said rim.

10. A sealing ring and rim assembly according to claim 9, wherein said bladder has an oval radial cross section.

11. A sealing ring and rim assembly according to claim according to claim 6, wherein said bladder has a diameter which is less than a diameter of the peripheral bead of the tiring casing so that, when said bladder and peripheral bead of the tire casing are concentrically disposed, said bladder fits entirely within the peripheral bead of the tire casing.

* * * * *

UNITED STATES PATENT AND TRADEMARK OFFICE
CERTIFICATE OF CORRECTION

PATENT NO.    : 6,406,282 B1
DATED         : June 18, 2002
INVENTOR(S)   : Presti It is certified that error appears in the above-identified patent and that said Letters Patent is hereby corrected as shown below:

Column 1,
Line 31, "sidewalk" should be -- sidewall --.
Line 35, "sidewalk" should be -- sidewall --.

Column 3,
Line 13, "laminate" should be -- lamina --.
Line 18, "16k" should be -- 16b --.
Line 20, "20k" should be -- 20b --.
Line 31, "16h" should be -- 16b --.
Line 33, "24k" should be -- 24b --.
Line 33, "18h" should be -- 18b --.
Line 35, "sidewalk" should be -- sidewall --.
Line 37, "24k" should be -- 24b --.
Line 46, "24h" should be -- 24b --.
Line 61, "20k" should be -- 20b --.

Column 4,
Line 18, "by" should be deleted.

Column 5,
Line 2, "sidewalk" should be -- sidewall --.

Column 6,
Line 16, "according to claim" should be deleted.
Line 37, "thing" should be -- tire --.

Column 7,
Line 1, "according to claim" should be deleted.

Signed and Sealed this

Twelfth Day of November, 2002

*Attest:*

*Attesting Officer*

JAMES E. ROGAN
*Director of the United States Patent and Trademark Office*